United States Patent [19]

Perrey et al.

[11] 4,101,468
[45] Jul. 18, 1978

[54] PROCESS FOR COLD-HARDENING POLYURETHANE FOAMS USING SULFONAMIDE EMULSIFIERS

[75] Inventors: Hermann Perrey, Krefeld; Hans-Joachim Meiners, Leverkusen, both of Fed. Rep. of Germany; Jürgen Ick, Coraopolis, Pa.

[73] Assignee: Bayer Aktiengesellschaft, Leverkusen, Fed. Rep. of Germany

[21] Appl. No.: 767,608

[22] Filed: Feb. 10, 1977

[30] Foreign Application Priority Data

Feb. 27, 1976 [DE] Fed. Rep. of Germany ....... 2607998

[51] Int. Cl.² .................. C08G 18/14; C07C 143/72
[52] U.S. Cl. ............................. 521/115; 260/556 A; 521/121; 521/904
[58] Field of Search ................ 260/2.5 AG, 556 A

[56] References Cited

U.S. PATENT DOCUMENTS

| | | | |
|---|---|---|---|
| 2,658,916 | 11/1953 | Krems | 260/556 AR |
| 2,692,235 | 10/1954 | Gebhart et al. | 252/526 |
| 3,979,454 | 9/1976 | Perrey et al. | 260/556 A |

OTHER PUBLICATIONS

Saunders et al., Polyurethanes (Part I, Chemistry) (Interscience) (N.Y.) (1962), p. 244.

*Primary Examiner*—H.S. Cockeram
*Attorney, Agent, or Firm*—Gene Harsh; Joseph C. Gil; William E. Parry

[57] ABSTRACT

The invention relates to a process for preparing cold-hardening foams containing urethane groups using as an emulsifier, sulphonamide compounds of the formula:

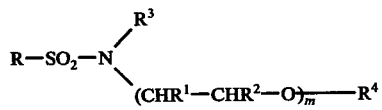

wherein
R represents an alkyl, chloroalkyl, cycloalkyl radical having from 8 to 30 carbon atoms, or an alkaryl radical having from 10 to 30 carbon atoms,
$R^1$ and $R^2$, which may be the same or different, each represent a hydrogen atom, a chloromethyl, methyl, ethyl or phenyl radical,
$m$ is an integer of from 0 to 50,
$R^3$ represents a hydrogen atom, an alkyl, aralkyl, alkaryl, aryl radical or a —(CHR¹—CHR²—O)$_m$—R⁴ group and
$R^4$ represents a hydrogen atom, an alkyl, aralkyl, acyl, carbamoyl or cyanalkyl radical having from 1 to 20 carbon atoms.

The use of these additions results in an increase in compression hardness without detrimental effects on other foam properties.

7 Claims, No Drawings

PROCESS FOR COLD-HARDENING POLYURETHANE FOAMS USING SULFONAMIDE EMULSIFIERS

BACKGROUND OF THE INVENTION

Foams containing urethane groups are widely used, for example in the field of insulation, for the production of structural elements and for upholstery purposes.

It is known that cold-hardening foams containing urethane groups may be produced from polyethers containing at least two hydroxyl groups, polyisocyanates, water and/or other blowing agents in the presence of catalysts, emulsifiers and, optionally, other additives such as flameproofing additives. They may be produced either in molds or in blocks (free-foamed foams). The function of the emulsifiers and stabilizers in the reaction mixture is to homogenize the reactants, to promote the foaming reaction and to prevent the foams from collapsing on completion of gas formation. The catalysts are intended to ensure that the reactions taking place during foam formation are brought into the required equilibrium and take place at the proper speed.

In many cases, the polyethers containing at least two hydroxyl groups which are used are those of the type having a molecular weight of from about 750 to 100,000, preferably from 2000 to 10,000.

Conventional cold-hardening foams containing urethane groups are frequently in need of improvement in regard to hardness and especially in regard to compression hardness. Accordingly, it is easy to understand the search for additives which are able to increase compression hardness without altering the polyol and polyisocyanate system. For example, it might be desired to reduce foam density for the same hardness, in contrast to additive-free systems, without at the same time adversely affecting the other mechanical properties, such as tensile strength, elongation at break and compression set. Hitherto numerous anion-active, cation-active and non-ionic emulsifiers have been described (for example, in Kunststoff-Handbuch, Vol. VII, by Vieweg and Hochtlen, Carl-Hanser-Verlag, Munich 1966, pages 103-110) which help to an extent with this problem.

DESCRIPTION OF THE INVENTION

In the process according to the present invention, certain sulphonamide compounds are used which, surprisingly, considerably increase the compression hardness of foams without at the same time adversely affecting the other mechanical properties of the resulting foam. This behavior of the sulphonamide compounds is surprising insofar as their surface-active properties, such as their emulsifying power, are no better than those of known emulsifiers.

The present invention therefore relates to a process for the production of cold-hardening foams containing urethane groups by foaming a mixture of polyethers having at least two hydroxyl groups and molecular weights of from about 750 to 100,000, polyisocyanates, water and/or organic blowing agents, emulsifiers and optionally, catalysts and other additives, distinguished by the fact that the emulsifiers added are sulphonamide compounds corresponding to the following general formula:

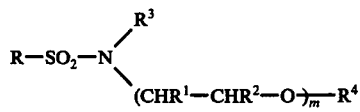

wherein
R represents an alkyl, chloroalkyl, or cycloalkyl radical having from 8 to 30 carbon atoms, or an alkaryl radical having from 10 to 30 carbon atoms,
$R^1$ and $R^2$, which may be the same or different, each represent a hydrogen atom, a chloromethyl, methyl, ethyl or phenyl radical,
m is an integer from 0 to 50,
$R^3$ represents a hydrogen atom, an alkyl, aralkyl, alkaryl, aryl radical or a —(CHR$^1$—CHR$^2$—O—)$_m$R$^4$-group and
$R^4$ represents a hydrogen atom, an alkyl, aralkyl, acyl, carbamoyl or cyanoalkyl radical having from 1 to 30 carbon atoms.

In $R^3$, the alkyl radical preferably contains from 1 to 8 carbon atoms, while the aralkyl and the alkaryl radicals preferably contain from 7 to 30 carbon atoms, the aryl radical most preferably containing from 6 to 14 carbon atoms. In $R^4$, the alkyl radical preferably contains from 1 to 8 carbon atoms, while the aralkyl radical preferably contains from 7 to 30 carbon atoms.

It is preferred to use those sulphonamide compounds corresponding to the above general formula wherein
R represents an n-alkyl or chloroalkyl radical having from 10 to 20 carbon atoms or a $C_8$-$C_{18}$ n-alkylphenyl radical,
$R^1$ and $R^2$ each represent a hydrogen atom or a methyl radical
m is an integer from 0 to 20,
$R^3$ represents a hydrogen atom or —CHR$^1$—CHR$^2$—O)$_m$R$^4$ ($R^1$, $R^2$ and m being as defined above) and
$R^4$ represents a hydrogen atom or, where m = 1 to 20, represents an acetyl, N-methyl, cyclohexyl, phenyl, carbamoyl or β-cyanoethyl radical.

The sulphonamide compounds used according to the present invention may readily be obtained by methods known from the literature, i.e. from the corresponding alkyl, chloroalkyl, cycloalkyl and alkaryl sulphochlorides (K. Lindner, Tenside-Textilhilfsmittel-Waschrohstoffe, Vol. 1, page 722; Houben-Weyl IX, pages 343-657). Reference is also made to German Offenlegungsschrift No. 2,415,330 which describes the production of alkyl sulphonic acid hydroxy amides according to the present invention from alkyl sulphochlorides and alkanolamines.

Alkyl, chloroalkyl and cycloalkyl sulphochlorides may be obtained, for example, by sulphochlorination of the corresponding alkanes. The sulphochlorination methods and the composition of the products are well known (cf. F. Asinger in Chemie und Technologie der Paraffinkohlenwasserstoffe, 1956, Akademie-Verlag, pages 395-474).

Suitable alkyl aryl sulphonic acid chlorides may be obtained, for example, from the alkyl aryl sulphonic acids obtained (in some cases even on a commercial scale) by the alkylation of aromatic compounds, followed by sulphonation (cf. F. Asinger, Die Petrochemische Industrie, Vol. II, page 1249, Akademie-Verlag, Berlin 1971) using conventional methods.

The sulphochlorides may be converted into sulphonamide compounds suitable for use in accordance with the present invention by reaction with ammonia or with aliphatic, araliphatic or aromatic primary or secondary amines, such as methyl amine, ethyl amine, propyl amines, butyl amines, hexyl amines, allyl amine, benzyl amine, aniline, dimethyl amine, diethyl amine, dipropyl amine, dibutyl amine, methyl propyl amine, methyl butyl amine, diallyl amine or methyl aniline.

The reaction products of the sulphochlorides and ammonia and also the primary amines may even be alkoxylated to form sulphonamide compounds suitable for use in the present invention. The alkoxylating agents include ethylene oxide, propylene oxide, 1,2- and 2,3-epoxy butane, 2,3-epoxy pentane, epichlorhydrin and styrene oxide. These processes are also known. It is preferred to use ethylene and/or propylene oxide.

On the other hand, the sulphochlorides may also be reacted with alkanolamines and dialkanolamines, for example and preferably with ethanolamine, diethanolamine, isopropanolamine and diisopropanolamine. Other examples of hydroxyl amines include N-methyl ethanolamine, N-cyclohexyl ethanolamine, N-benzyl ethanolamine and N-phenyl ethanolamine which form sulphonic acid amide compounds suitable for use in the present invention. These alkanolamides may optionally be modified by reaction with the alkylene oxides mentioned above.

Sulphonamide compounds which are also suitable for use in the present invention may be obtained from the sulphonamides described above, wherein $m=0$ and $R^4$ represents hydrogen, i.e. which contain an NH-group. Preferably they can be obtained from the sulphonamides wherein $m=1$ and $R^4$ represents hydrogen, i.e. which contain a hydroxy alkyl group, by acylation, cyanoalkylation or by reacting the NH- or the OH-groups with isocyanates.

Acylation of the sulphonamide group or the hydroxyl group may be carried out by any of the acylation processes known from the literature (cf. Houben-Weyl IX, page 636 and Houben-Weyl VIII, page 503), for example by reaction with known aliphatic or aromatic carboxylic acids, carboxylic acid halides or anhydrides, ketenes or esters, such as acetic acid, propionic acid, butyric acid, valeric acid, caproic acid or benzoic acid, the acid chlorides thereof, anhydrides or esters of lower alcohols, formic acid and ketene. Acetylation is preferably carried out with acetanhydride, acetic acid or ketene.

For the cyanoalkylation reaction which is carried out by methods known from the literature (cf. O. Bayer, Angew. Chemie 61, 229 (1949), basically any $\alpha,\beta$-unsaturated nitriles are capable of addition with the NH- or OH-group although it is preferred to use acrylonitrile and methacrylonitrile.

Reaction of the sulphonamide or the hydroxyl group with isocyanates is also known (cf. Houben-Weyl VIII, pages 131, 134). Any known aliphatic or aromatic isocyanates, such as methyl, cyclohexyl, phenyl, ethyl, propyl, tolyl or p-chlorophenyl isocyanate, may be used. It is preferred to use the first three.

In some cases, the effect of the sulphonamide compounds may be improved by additions of alkyl, chloroalkyl, cycloalkyl and alkaryl sulphonates containing from 8 to 30 carbon atoms in the alkyl radical and from 10 to 30 carbon atoms in the alkaryl radical. Suitable sulphonates are alkali metal, ammonium, mono-, di- and tri-alkyl ammonium or even alkanolamine salts of the sulphonic acids used in up to the same quantities by weight, based on the sulphonamides.

According to the present invention, the sulphonamide compounds are generally used in quantities of from 0.01 to 10%, by weight, preferably in quantities of from 0.1 to 5%, by weight, based on the polyethers.

Suitable polyisocyanates include aliphatic, cycloaliphatic, araliphatic, aromatic and heterocyclic polyisocyanates of the type known in the art and described for example by W. Siefken in Justus Liebigs Annalen der Chemie, 562, pages 75 to 136; for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785; U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenyl methane-2,4'-and/or -4,4'-diisocyanate; naphthylene-1,5-diisocyanate; triphenyl methane-4,4',4''-triisocyanate; polyphenyl polymethylene polyisocyanates of the type which may be obtained by condensing aniline with formaldehyde, followed by phosgenation and described in, for example, in British Patents 874,430 and 848,671; m- and p-isocyanatophenyl sulphonyl isocyanates as described in U.S. Pat. No. 3,454,606; perchlorinated aryl polyisocyanates of the type described, for example, in U.S. Pat. No. 3,277,138; polyisocyanates containing carbodiimide groups of the type described in U.S. Pat. No. 3,152,162; diisocyanates of the type described in U.S. Pat. No. 3,492,330; polyisocyanates containing allophanate groups of the type described in British Pat. No. 994,890, Belgian Pat. No. 761,626 and published Dutch Pat. Application 7,102,524; polyisocyanates containing isocyanurate groups of the type described in U.S. Pat. No. 3,001,973; German Pat. Nos. 1,022,789; 1,222,067 and 1,027,394 and in German Offenlegungsschrift Nos. 1,929,034 and 2,004,048; polyisocyanates containing urethane groups of the type described in Belgian Pat. No. 752,261 or in U.S. Pat. No. 3,394,164; polyisocyanates containing acylated urea groups as described in German Pat. No. 1,230,778; polyisocyanates containing biuret groups of the type described in U.S. Pat. Nos. 3,124,605 and 3,201,372 and in British Pat. No. 889,050; polyisocyanates obtained by telomerization reactions of the type described in U.S. Pat. No. 3,654,106; polyisocyanates containing ester groups of the type described in British Pat. No. 965,474 and 1,072,956, in U.S. Pat. No. 3,567,763 and in German Pat. No. 1,231,688; reaction products of the above-mentioned isocyanates with acetals as described in German Pat. No. 1,072,385 and polyisocyanates containing polymeric fatty acid radicals as described in U.S. Pat. No. 3,455,883.

It is also possible to use the distillation residues accumulating in the production of isocyanates on a commercial scale, optionally dissolved in one or more of the aforementioned polyisocyanates. It is also possible to use mixtures of the aforementioned polyisocyanates.

In general, it is particularly preferred to use the commercially readily available polyisocyanates such as 2,4- and 2,6-tolylene diisocyanate and mixtures of these isomers ("TDI"); polyphenyl polymethylene polyisocyanates of the type obtained by aniline-formaldehyde condensation and subsequent phosgenation ("crude MDI"); and polyisocyanates containing carbodiimide groups, urethane groups, allophanate groups, isocyanurate groups, urea groups or biuret groups ("modified polyisocyanates").

Monofunctional isocyanates, such as propyl isocyanate, cyclohexyl isocyanate, phenyl isocyanate, tolyl isocyanate and p-chlorophenyl isocyanate, may also be used. However, the quantity in which they are present should not make up any more than 20%, by weight, of the polyisocyanates used.

Other suitable starting materials include polyethers containing at least 2, generally from 2 to 8 and preferably 2 or 3 hydroxyl groups and generally having molecular weights of from 750 to 100,000. Polyethers of this type are known and may be obtained, by methods such as the polymerization of epoxides, such as ethylene oxide, propylene oxide, butylene oxide, tetrahydrofuran, styrene oxide or epichlorhydrin, on their own (for example in the presence of $BF_3$) or by the chemical addition of these epoxides, optionally in admixture or in succession, to starter components having reactive hydrogen atoms, such as water, alcohols or amines such as ethylene glycol, 1,3- or 1,2-propylene glycol, trimethylol propane, 4,4'-dihydroxy diphenyl propane, aniline, ammonia, ethanolamine, ethylene diamine and the like. In many cases, it is preferred to use polyethers of the type which contain predominate amounts of primary OH-groups (up to 90%, by weight, based on all the OH-groups present in the polyether). Polyethers modified by vinyl polymers of the type obtained, for example, by the polymerization of styrene and acrylonitrile in the presence of polyethers (see U.S. Pat. Nos. 3,383,351; 3,304,273; 3,523,093 and 3,110,695 and German Pat. No. 1,152,536) are also suitable, as are polybutadienes containing OH-groups.

The above-mentioned polyethers may also be modified by reaction with less than equivalent quantities of polyisocyanate.

The relatively high molecular weight polyethers used in the present invention may also be used in admixture with low molecular weight compounds containing active hydrogen atoms which have molecular weights of up to 750 or in admixture (up to 50%, by weight, based on the polyether) with other relatively high molecular weight compounds containing active hydrogen atoms. Particularly suitable low molecular weight compounds containing active hydrogen atoms are compounds containing hydroxyl groups, e.g. ethylene glycol; 1,3-butylene glycol; 1,4-butylene glycol; glycerol; trimethylol propane; caster oil, or adducts (generally molecular weights of from 200 to 750) of alkylene oxides, such as ethylene oxide, propylene oxide or butylene oxide, with water or the low molecular weight compounds containing active hydrogen atoms. Other relatively high molecular weight compounds containing active hydrogen atoms are known compounds, such as polyesters, polyacetals, polythioethers, polyesteramides and polycarbonates.

Examples of suitable polyesters containing hydroxyl groups are the reaction products of polyhydric (preferably dihydric and, optionally, trihydric) alcohols with polybasic (preferably dibasic) carboxylic acids. Instead of the free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and can be substituted, for example, by halogen atoms, and/or be unsaturated. Examples of these polycarboxylic acids are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester, terephthalic acid-bisglycol ester. Examples of suitable polyhydric alcohols are ethylene glycol, 1,2- and 1,3-propylene glycol, 1,4- and 2,3-butylene glycol, 1,6-hexanediol, 1,8-octanediol, neopentyl glycol, cyclohexane dimethanol (1,4-bis-hydroxy methyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example, ε-caprolactone, or hydroxy carboxylic acids, for example ω-hydroxy caproic acid, may also be used.

Suitable polyacetals are, for example, those compounds which can be obtained from glycols, such as diethylene glycol, triethylene glycol, 4,4'-dioxethoxy diphenyl dimethyl methane, hexane diol and formaldehyde. Polyacetals for the purposes of the present invention may also be obtained by polymerizing cyclic acetals.

Useful polythioethers, include the condensation products of thiodiglycol with itself and/or with other glycols, dicarboxylic acids, formaldehyde, amino carboxylic acids or amino alcohols. Depending upon the co-components, these products are polythio mixed ethers, polythioether esters, polythioether ester amides.

Suitable polycarbonates containing hydroxyl groups are those generally known which can be obtained by reacting diols, such as 1,3-propane diol, 1,4-butane diol and/or 1,6-hexane diol, diethylene glycol, triethylene glycol, tetraethylene glycol, with diaryl carbonates (such as diphenyl carbonate, for example) or phosgene.

Examples of the polyester amides and polyamides are the predominantly linear condensates obtained from polyhydric saturated and unsaturated amino alcohols, diamines, polyamines and mixtures thereof.

Polyhydroxyl compounds containing urethane or urea groups (and optionally modified natural polyols, such as castor oil, carbohydrates and starch) may also be used. Addition products of alkylene oxides with phenol-formaldehyde resins or even with urea-formaldehyde resins may also be used.

Examples of the many compounds used in accordance with the present invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54. and Vol. II, 1964, pages 5 – 6 and 198-199, and in Kunststoff-Handbuch, Vol. VII, Vieweg-Hochtlen, Carl-Hanser-Verlag, Munich 1966, for example on pages 45 to 71.

According to the present invention, water and/or readily volatile organic substances are often used as blowing agents. Suitable organic blowing agents include acetone; ethyl acetate; halogen-substituted alkanes, such as methylene chloride, chloroform, ethylidene chloride, vinylidene chloride, monofluorotrichloromethane, chlorodifluoromethane and dichlorodifluoromethane; butane; hexane; heptane; diethyl ether and the like. A blowing effect may also be obtained by adding compounds which decompose at temperatures above room temperature giving off gases such as nitrogen. Example of such compounds are azo compounds, such as azoisobutyronitrile. Further examples of blowing agents and information on the use of blowing agents may be found in Kunststoof-Handbuch, Vol. VII, by Vieweg and Hochtlen, Carl-Hanser-Verlag, Munich, 1966, for example on pages 108 and 109, 453 to 455 and 507 to 510.

According to the present invention, catalysts are also frequently used. Examples of suitable catalysts are those generally known and used in the art. Examples include tertiary amines, such as triethyl amine, tributyl amine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzyl amine, bis-(N,N-diethyl amino ethyl)-adipate, N,N-dimethyl benzyl amine, pentamethyl diethylene triamine, N,N-dimethyl cyclohexyl amine, N,N,N',N'-tetramethyl-1,3-butane diamine, N,N-dimethyl-$\beta$-phenyl ethyl amine, 1,2-dimethyl imidazole, 2-methyl imidazole. Other suitable catalysts include known Mannich bases of secondary amines, such as dimethyl amine, and aldehydes, preferably formaldehyde, or ketones, such as acetone, methyl ethyl ketone and cyclohexanone, and phenols, such as phenol, nonylphenol and bis-phenol.

Examples of tertiary amine catalysts containing isocyanate-reactive hydrogen atoms are triethanolamine, triisopropanolamine, N-methyl diethanolamine, N-ethyl diethanolamine, N,N-dimethyl ethanolamine and their reaction products with alkylene oxides, such as propylene oxide and/or ethylene oxide.

Other suitable catalysts are silaamines having carbon-silicon bonds of the type described, for example, in U.S. Pat. No. 3,620,984. Examples include 2,2,4-trimethyl-2-silamorpholine and 1,3-diethyl aminomethyl tetramethyl disiloxane.

Other suitable catalysts include nitrogen-containing bases, such as tetraalkyl ammonium hydroxides; alkali metal hydroxides, such as sodium hydroxide; alkali metal phenolates, such as sodium phenolate; and alkali metal alcoholates, such as sodium methylate. Hexahydrotriazines can also be used as catalysts.

According to the present invention, organometallic compounds, especially organo tin compounds, may also be used as catalysts. Preferred organotin compounds are tin (II) salts of carboxylic acids, such as tin(II)acetate, tin(II) octoate, tin(II)ethyl hexoate and tin(II)laurate; and the tin(IV) compounds such as dibutyl tin oxide, dibutyl tin dichloride, dibutyl tin diacetate, dibutyl tin dilaurate, dibutyl tin maleate or dioctyl tin diacetate. It is of course possible to use all the above-mentioned catalysts in the form of mixtures.

Further examples of catalysts suitable for use in the present invention and details on the way in which the catalysts work may be found in Kunststoff-Handbuch, Vol. VII, by Vieweg and Hochtlen, Carl-Hanser-Verlag, Munich, 1966, for example on pages 96 to 102.

The catalysts are generally used in quantities of from about 0.001 to 10%, by weight, based on the quantity of polyethers having a molecular weight of from 750 to 100,000.

Conventional surface-active additives, emulsifiers, and foam stabilizers may be used in addition to those sulphonamide compounds of the present invention. Examples of emulsifiers are the sodium salts of castor oil sulphonates or salts of fatty acids with amines, such as diethyl amine/oleic acid or diethanolamine/stearic acid. Alkali metal or ammonium salts of sulphonic acids, such as those of dodecyl benzene sulphonic acid or dinaphthyl methane disulphonic acid, or of fatty acids, such as ricinoleic acid, or of polymeric fatty acids, may also be used as surface-active additives.

Particularly suitable as foam stabilizers are polyether siloxanes, especially water-soluble types. These compounds are generally of such structure that a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the present invention, it is also possible to use reaction retarders (for example substances which are acid in reaction, such as hydrochloric acid or organic acid halides); known cell regulators, such as paraffins or fatty alcohols or dimethyl polysiloxanes; pigments and/or dyes; known flameproofing agents, for example, tris-chlorethyl phosphate, tricresyl phosphate or ammonium phosphate and polyphosphate; stabilizers against the effects of ageing and weather; plasticizers; substances with fungistatic and bacteriostatic effects; and fillers, such as barium sulphate, kieselguhr, carbon black or prepared chalk.

Further examples of these surface-active additives, foam stabilizers, cell regulators, reaction retarders, stabilizers, flameproofing substances, plasticizers, dyes and fillers, substances with fungistatic and bacteriostatic effects, and also details on the way in which these additives are to be used and how they work, may be found in Kunststoff-Handbuch, Vol. VII, published by Vieweg and Hochtlen, Carl-Hanser-Verlag, Munich, 1966, for example on pages 103 to 113.

According to the present invention, the reaction components may be reacted by the known single-stage process, by the prepolymer process, or by the semi-prepolymer process, in many cases using machines of the type described, for example, in U.S. Pat. No. 2,764,565. Particulars of processing equipment suitable for use in accordance with the present invention may be found for example on pages 121 and 205 of Kunststoff-Handbuch, Vol. VII, published by Vieweg and Hochtlen, Carl-Hanser-Verlag, Munich, 1966.

In the production of foams, the foaming reaction is preferably carried out in molds. To this end, the reaction mixture is introduced into a mold. Suitable mold materials are metals, for example aluminum, or plastics, for example epoxide resins. Inside the mold the foamable reaction mixture foams and forms the molding. In-mold foaming may be carried out in such a way that the molding has a cellular structure at its surface although it may be carried out in such a way that the molding has a compact skin and a cellular core. According to the present invention, it is possible in this connection to introduce the foamable reaction mixture into the mold in such a quantity that the foam formed just fills the mold. However, it is also possible to introduce into the mold more foamable reaction mixture than is required for filling the mold with foam. This technique is known as "overcharging" and is described, for example, in U.S. Pat. Nos. 3,178,490 and 3,182,104.

Known "external release agents", such as silicone oils, are frequently used for in-mold foaming. However, it is also possible to use so-called "internal release agents", optionally in admixture with external release agents, as described for example, in German Offenlegungsschriften Nos. 2,121,670 and 2,307,589.

According to the present invention, cold-hardening foams are produced (cf. British Pat. No. 1,162,517 and German Offenlegungsschrift No. 2,153,086).

It is of course also possible to produce free-foamed foams according to the present invention.

The products obtainable in accordance with the present invention may be used for conventional applications such as upholstery materials.

Sulphonamide compounds corresponding to the following general formula are used in the following Examples:

Table 1

$$R-SO_2-N \begin{matrix} R^3 \\ (CHR^1-CHR^2-O)_m-R^4 \end{matrix}$$

| Sulphon-amide | R | $R^1$ | $R^2$ | m | $R^3$ | $R^4$ |
|---|---|---|---|---|---|---|
| A | $C_{12}$-$C_{18}$-alkyl* | H | H | 1 | H | H |
| B | " | H | H | 1 | H | —CO—$CH_3$— |
| C | " | H | $CH_3$ | 1 | H | H |
| D | " | H | $CH_3$ | 1 | H | —CO—$CH_3$— |
| E | " | H | H | 3 | H | H |
| F | " | H | H | 3 | H | CO—$CH_3$ |
| G | " | H | H | 5 | H | H |
| H | " | H | H | 5 | H | —CO—$CH_3$— |
| I | " | H | H | 7 | H | H |
| K | " | H | H | 7 | H | —CO—$CH_3$— |
| L | " | H | $H_{0.5}$ ($CH_3$)$_{0.5}$ | 1 | H | —CO—$CH_3$— |
| M | " | H | H | 1 | H | —$CH_2$—$CH_2$—CN |
| N | $C_{10}$-$C_{13}$-alkyl** | H | H | 5 | H | H |
| O | dodecyl-phenyl | H | H | 1 | H | H |

*$C_{12}$-$C_{18}$-alkyl comprises a mixture of following fractions:
5% b.w. of $C_{12}$
11% b.w. of $C_{13}$
21% b.w. of $C_{14}$
24% b.w. of $C_{15}$
20% b.w. of $C_{16}$
14% b.w. of $C_{17}$
5% b.w. of $C_{18}$

**$C_{10}$-$C_{13}$-alkyl comprises a mixture of following fractions:
5% b.w. of $C_{10}$
46% b.w. of $C_{11}$
39% b.w. of $C_{12}$
10% b.w. of $C_{13}$ The sulphonamide addition L is a molar mixture of the additions B and D and was produced by acetylating a molar mixture of the sulphonamides A and C.

Although the Examples merely show the mechanical data of molded foams, similar percentage improvements in compression hardness may be obtained in the case of free-foamed foams.

EXAMPLE 1

(A) 50 parts by weight of a trimethylol-propane-started polypropylene glycol modified with ethylene oxide in such a way that there are 60% of primary hydroxyl groups for an OH—number of 28; and 50 parts by weight of a trimethylol-propane-started polypropylene glycol which was modified with ethylene oxide in such a way that 70% terminal primary hydroxyl groups were obtained, and which, in addition, was grafted with acrylonitrile and styrene in a ratio of 60:40 and had an OH—number of 28, 2.7 parts, by weight of water, 0.15 part, by weight, of diazabicyclo-2,2,2-octane (as catalyst), 0.08 part, by weight, of 2,2'-dimethylamino diethyl ether (as catalyst), 1.0 part, by weight, of the siloxane of Example 1 of German Offenlegungsschrift 2,221,811 and 0.1 part, by weight, of a polyether polysiloxane marketed by Th. Goldschmidt AG, Essen (West Germany) under the trade name "Tegostab® B2909," are mixed with (B) 1 part, by sweight, of a sulphonamide addition according to Table 2 and reacted in a mold with (C) 34.0 parts, by weight, of a tolylene diisocyanate mixture (2,4- and 2,6-isomers in a ratio, by weight, of 80:20%) and 20.0 parts, by weight, of a polyphenyl polymethylene polyisocyanate obtained by condensing aniline with formaldehyde, followed by phosgenation (NCO content 44.7% b.w.).

(D) In a comparison test, the mixture just described was reacted in the absence of a sulphonamide.

(E) Molded foams with the following mechanical properties are obtained.

Table 2:

Change in compression hardness according to DIN 53 577, based on the compression hardness of the comparison foam produced in the absence of a sulphonamide.

Compression hardness of comparison foam:
Compression test according to DIN 53 577 (KPa) 4.1

Table 2:

Change in compression hardness according to DIN 53 577, based on the compression hardness of the comparison foam produced in the absence of a sulphonamide.
Compression hardness of comparison foam:
Compression test according to DIN 53 577 (KPa) 4.1

| Sulphonamide addition according to Table 1 | Change in compression hardness (to the nearest 5%) |
|---|---|
| A | +10% |
| B | + 5% |
| C | +10% |
| D | + 5% |
| E | +15% |
| F | + 5% |
| G | + 5% |
| H | +10% |
| I | + 5% |
| K | + 5% |
| L | +20% |
| M | + 5% |
| N | + 5% |
| O | + 5% |

The other mechanical data are not altered in relation to the comparison foam by the sulphonamide additions.

| Gross density DIN 53 420 (kg/m$^3$) | 43 |
|---|---|
| Tensile strength DIN 53 571 (KPa) | 170 |
| Elongation at break DIN 53 571 | 170 |

EXAMPLE 2

(A) 100 parts, by weight, of a trimethylol propane-started polypropylene glycol modified with ethylene oxide in such a way that there are 60% of terminal primary hydroxyl groups for an OH-number of 35,
   2.5 parts, by weight, of water,
   0.6 part, by weight, of diazabicyclo-2,2,2-octane
   1.0 part, by weight, of triethanolamine
   0.4 part, by weight of triethylamine
   1.0 part, by weight of a siloxane of Example 1 of German Offenlegungsschrift No. 2,221,811 are mixed with (B) 1.0 part, by weight, of a sulphonamide addition according to Table 3 are reacted in a mold with (C) 41.4 parts, by weight, of an isocyanate mixture of which 40%, by weight, consists of a tolylene diisocyanate mixture (2,4- and 2,6-isomer in a ratio of 65:35) and 60%, by weight, of a polyphenyl polymethylene polyisocyanate (viscosity approximately 200 cP at 25° C). The polyphenyl polymethylene polyisocyanate was obtained by condensing aniline with formaldehyde, followed by phosgenation (NCO content 38% b.w.).

(D) Molded foams with the following mechanical properties are obtained:

Table 3:

Change in compression hardness according to DIN 53 577, based on the compression hardness of a comparison foam produced in the absence of a sulphonamide.
Compression hardness of the comparison foam:
Compression test according to DIN 53 577 (KPa) 2.0

Table 3:

Change in compression hardness according to DIN 53 577, based on the compression hardness of a comparison foam produced in the absence of a sulphonamide.
Compression hardness of the comparison foam:
Compression test according to DIN 53 577 (KPa) 2.0

| Sulphonamide addition according to Table 1 | Change in compression hardness (to the nearest 5%) |
|---|---|
| A | + 5% |
| L | +10% |

The other mechanical values are not altered in relation to the comparison foam by the sulphonamide additions:

| Gross density DIN 53 420 (kg/m$^3$) | 45 |
|---|---|
| Tensile strength DIN 53 571 (KPa) | 60 |
| Elongation at break DIN 53 571 (%) | 100 |

EXAMPLE 3

(A) 100 parts, by weight, of a trimethylol propane-started polypropylene glycol modified with ethylene oxide in such a way that there are 60% of terminal primary hydroxyl groups for an OH-number of 28,
   3.2 parts, by weight, of water
   0.15 part, by weight, of diazabicyclo-2,2,2-octane and
   1.0 part, by weight, of the siloxane of Example 1 of German Offenlegungsschrift No. 2,221,811 are mixed with (B) 1.0 part, by weight, of a sulphonamide addition according to Table 4 and reacted in a closed mold with (C) 39.0 parts, by weight, of the isocyanate described below: 20 parts of 1,2-propylene glycol are added at 60° C to a mixture of 225 parts of a mixture of 80%, by weight, of 2,4- and 20%, by weight, of 2,6-tolylene diisocyanate and 274 parts of 4,4'-diphenyl methane diisocyanate, followed by reaction for 30 minutes in a metal mold. Following the addition of 1 part of β-phenyl ethyl ethylene imine, the temperature is increased to 130° C. The trimerization reaction which takes place at this temperature is stopped after 2.5 hours, by which time the NCO-content of the reaction mixture has reached 26.5%, by the addition of 1 part of p-toluene sulphonic acid methyl ester.

After dilution with 624 parts of an 80%/20%, by weight, mixture of 2,4- and 2,6-tolylene diisocyanate, a polyisocyanate solution characterized by the following data is obtained: %-NCO: 38.4; cP$_{25°C}$: 24; n$_D^{50}$: 1.5738.

(D) Molded foams with the following mechanical properties are obtained:

Table 4:

Change in compression hardness according to DIN 53 577, based on the compression hardness of a comparison foam produced in the absence of a sulphonamide.
Compression hardness of the comparison foam:
Compression test according to DIN 53 577 (KPa) 3.3

Table 4:

| Change in compression hardness according to DIN 53 577, based on the compression hardness of a comparison foam produced in the absence of a sulphonamide. Compression hardness of the comparison foam: Compression test according to DIN 53 577 (KPa) 3.3 ||
| --- | --- |
| Sulphonamide addition according to Table 1 | Change in compression hardness (to the nearest 5%) |
| A | + 5% |
| L | +15% |

The other mechanical data are not altered by the sulphonamide addition.

| | |
| --- | --- |
| Gross density DIN 53 420 (kg/m$^3$) | 43 |
| Tensile strength DIN 53 571 (KPa) | 130 |
| Elongation at break DIN 53 571 (%) | 120 |

What is claimed is:

1. In a process for the production of cold-hardening foams containing urethane groups by foaming a mixture of polyethers containing at least two hydroxyl groups and having a molecular weight of from about 750 to 100,000, polyisocyanates, water and/or organic blowing agents, emulsifiers and catalysts the improvement wherein, said emulsifier comprises sulphonamide compounds corresponding to the following general formula:

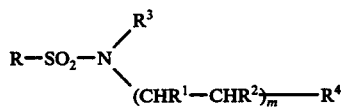

wherein
R represents an alkyl, chloroalkyl, cycloalkyl radical having from 8 to 30 carbon atoms, or an alkaryl radical having from 10 to 30 carbon atoms,
R$^1$ and R$^2$, which may be the same or different, each represent a hydrogen atom, a chloromethyl, methyl, ethyl or phenyl radical,
m is an integer of from 0 to 50,
R$^3$ represents a hydrogen atom, an alkyl, aralkyl, alkaryl, aryl radical or a —(CHR$^1$—CHR$^2$—O—)$_m$R$^4$-group and
R$^4$ represents a hydrogen atom, an alkyl, aralkyl, acyl, carbamoyl or cyanoalkyl radical having from 1 to 30 carbon atoms.

2. The process of claim 1 wherein R$^3$ is an alkyl radical containing from 1 to 8 carbon atoms; an aralkyl or alkaryl containing from 7 to 30 carbon atoms; or an aryl radical containing from 6 to 14 carbon atoms and R$^4$ is an alkyl radical containing from 1 to 8 carbon atoms or an aralkyl radical containing from 7 to 30 carbon atoms.

3. The process of claim 1 wherein the sulphonamide compounds used are those wherein
R represents an n-alkyl or chloroalkyl radical having from 10 to 20 carbon atoms or a C$_8$-C$_{18}$-n-alkyl phenyl radical,
R$^1$ and R$^2$ represent a hydrogen atom or a methyl radical,
m is an integer of from 0 to 20,
R$^3$ represents a hydrogen atom or —CHR$^1$—CHR$^2$—O)$_m$R$^4$ wherein R$^1$, R$^2$, m and R$^4$ are as defined in this claim and
R$^4$ represents a hydrogen atom or where $m = 1$ to 20, represents an acetyl, N-methyl, cyclohexyl, phenyl, carbamoyl or β-cyanoethyl radical.

4. The process of claim 1 wherein R is a C$_{12}$-C$_{18}$-alkyl mixture, a C$_{10}$-C$_{13}$-alkyl mixture or dodecyl phenyl.

5. The process of claim 1 wherein R$^4$ is hydrogen, —CO-CH$_3$ or -CH$_2$-CH$_2$-CN.

6. The process of claim 1 wherein said sulphonamide compounds are used in quantities of from 0.01 to 10% by weight based on the polyethers.

7. The process of claim 1 wherein said sulphonamide compounds are used in quantities of from 0.1 to 5% by weight based on the polyethers.

* * * * *